United States Patent [19]

Plevak et al.

[11] 4,266,891
[45] May 12, 1981

[54] SUPPORT ASSEMBLIES FOR MINE WORKINGS

[75] Inventors: Lubomir Plevak, Lünen; Jürgen Dodt, Menden, both of Fed. Rep. of Germany

[73] Assignee: Gewerkschaft Eisenhutte Westfalia, Lünen, Fed. Rep. of Germany

[21] Appl. No.: 974,538

[22] Filed: Dec. 29, 1978

[30] Foreign Application Priority Data

Jan. 5, 1978 [DE] Fed. Rep. of Germany ....... 2800376

[51] Int. Cl.³ ............................................ E21D 15/44
[52] U.S. Cl. .................................. 405/291; 403/318; 403/364; 405/293
[58] Field of Search ............... 405/291, 293, 297, 299, 405/300, 301; 52/582, 585, 586; 403/318, 364, 355; 299/31-33; 248/357

[56] References Cited

U.S. PATENT DOCUMENTS

| 2,483,032 | 9/1949 | Baer | 403/355 X |
| 2,991,097 | 7/1961 | Vanwersch et al. | 405/297 X |
| 3,891,275 | 6/1975 | Spies | 299/32 |
| 3,961,487 | 6/1976 | Blumenthal | 405/291 |
| 4,062,194 | 12/1977 | Allen | 405/297 |

FOREIGN PATENT DOCUMENTS 1033613  7/1958  Fed. Rep. of Germany ........... 405/297

Primary Examiner—David H. Corbin
Attorney, Agent, or Firm—Thompson, Birch, Gauthier & Samuels

[57] ABSTRACT

A support assembly for a mine working has a floor-sill structure for engaging on the floor of the working and a roof-engaging member or members braced by one or more props against the roof of the working. The floor-sill structure employs one or more slidable skids which can be selectively extended in length at the forward end by fitting an extension component of the same width thereto. The or each skid is recessed to receive rear projections of the associated extension component and securing means, such as spindles or shaped locking elements, are used to secure the extension component to the skid. When the extension component is removed, inserts are located in the recesses of the skid to fill the latter and these inserts can be likewise secured with the same securing means.

14 Claims, 6 Drawing Figures

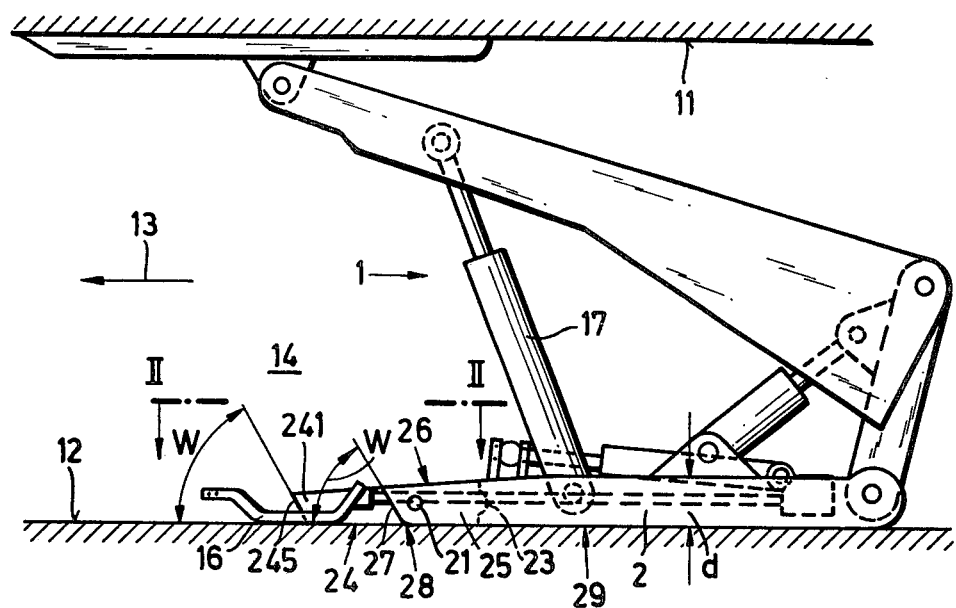
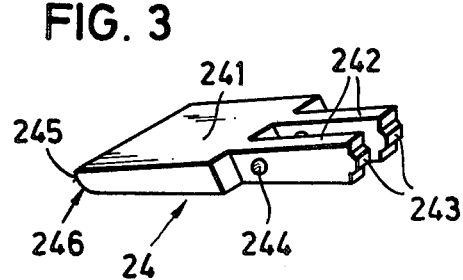
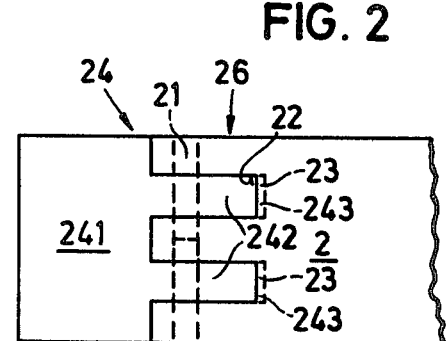
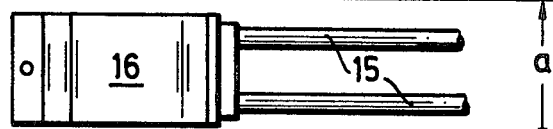
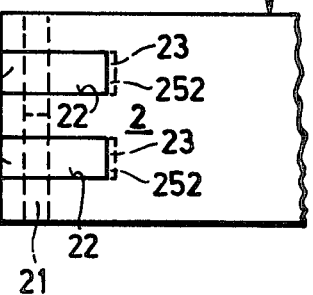
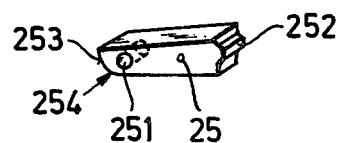

SUPPORT ASSEMBLIES FOR MINE WORKINGS

BACKGROUND TO THE INVENTION

The present invention relates to support assemblies for use in mine workings and, more particularly, to improved forms of floor structures for such assemblies.

Support assemblies of various constructions are employed in mine workings. Usually, such assemblies are displaceable to follow up the winning progress and their floor-sills often utilize skids for sliding over the floor of the working. To enable the assembly to cope with irregularities in the floor surface, the skids are conventionally spaced apart laterally of the assembly and interconnected in a flexible manner permitting relative displacement between the skids. Where the floor is especially soft, it is known to increase the floor-engaging area of the skids with the aid of a front-attachment skid extending the whole width of the assembly and fitted to the main skids with bolts or spindles. An arrangement of this type is described in German Pat. No. 2453257. This known arrangement suffers from a number of disadvantages. The front skid can only be used with one type of floor structure, i.e. with two floor skids spaced apart by a certain distance, and it cannot be used with other forms of floor structure, e.g., with a single individual floor skid. When the front skid is affixed to the spaced-apart floor skids, it bridges the gap therebetween and thus negates the capacity of the floor structure to adapt to floor irregularity by relative displacement between the floor skids. The front skid also takes up considerable space and generally obstructs means, usually a beam, connecting the assembly to a conveyor. This latter disadvantage is especially a problem with thin mineral seams where the connecting means or beam should be as close to the floor as possible.

A general objection of the present invention is to provide an improved adaptable floor sill structure for a support assembly.

SUMMARY OF THE INVENTION

In accordance with the invention, the floor skid or sill structure of a support assembly has a floor-engaging skid with at least one separate extension component fitted to its forward end. In the case of several skids, each would have its own associated extension component. Each extension component would have the same width as the skid, would engage in a recess of the skid and would be secured in a detachable manner by suitable securing means. Preferably, the or each skid would have several recesses at its forward end which receive rear projections of the associated extension component. To provide a more rigid connection between the extension component and its skid, it is desirable to provide ribs on the projections of the component which engage in grooves in the innermost end walls of the recesses.

The floor area of the or each skid can be effectively increased by fitting the extension component thereto. In the case of the spaced-apart skids, the extension components would not, however, interfere with their relative displacement to cope with floor irregularities and the extension components would not obstruct connection between the assembly and a conveyor arranged at the mineral face side of the assembly.

The fitting or removal of an extension component can be accomplished quite simply and quickly. Where the extension component is removed from a skid, the recesses in the skid are preferably filled with additional components or inserts likewise secured with the same securing means as the extension component. In this way, the recesses are protected against damage and soiling. These inserts may likewise have ribs engaging in the grooves in the recess and walls.

The invention can be applied to a variety of support assemblies. Where relatively thick seams are being worked, the props of the assembly would normally be more or less upright and considerable pressure is applied to the floor via the floor-engaging skid or skids. By fitting the extension components of the invention, however, the skid or skids can be prevented from becoming pressed into the floor. Where relatively thin seams are being worked, the props of the assembly would take an inclined position and the floor pressure is less. In this case, the or each extension component is removed and this results in an increase in the size of the free forward zone which is highly desirable for access and ventilation purposes in the case of thin seams.

The extension component would normally have upper and lower surfaces and side surfaces which form continuations of the respective upper and lower surfaces and side surfaces of the skid. Likewise, the additional component or insert would normally have upper and lower surfaces which extend substantially flush with the respective upper and lower surfaces of the skid.

The extension components, the additional component and the associated skid have various preferred features concerned with their shape which features are described in detail hereinafter in connection with preferred embodiments of the invention.

In its simplest form, the extension component has a projection with side surfaces and the additional component or insert has similar side surfaces and these side surfaces can engage with side surfaces of the associated recess in the skid. These engaging side surfaces extend parallel to the outer side surfaces of the skid and the securing means, which may take the form of spindles or shaped locking elements engaging in bores or further recesses, extends across the engaging side surfaces.

The invention may be understood more readily and various other features and aspects of the invention may become apparent from consideration of the following description.

BRIEF DESCRIPTION OF DRAWINGS

Embodiments of the invention will now be described, by way of examples only, with reference to the accompanying drawings, wherein FIG. 1 is a schematic side view of a support assembly constructed in accordance with the invention;

FIG. 2 is a plan view of part of the floor sill structure of the assembly of FIG. 1, the view being taken along the line II—II of FIG. 1;

FIG. 3 is a perspective view of a replaceable component for use with the floor skids of the support assembly of FIG. 1.

FIG. 4 is a perspective view of another replaceable component for use with the floor skids of the support assembly of FIG. 1;

DESCRIPTION OF PREFERRED EMBODIMENTS

Figure 6:
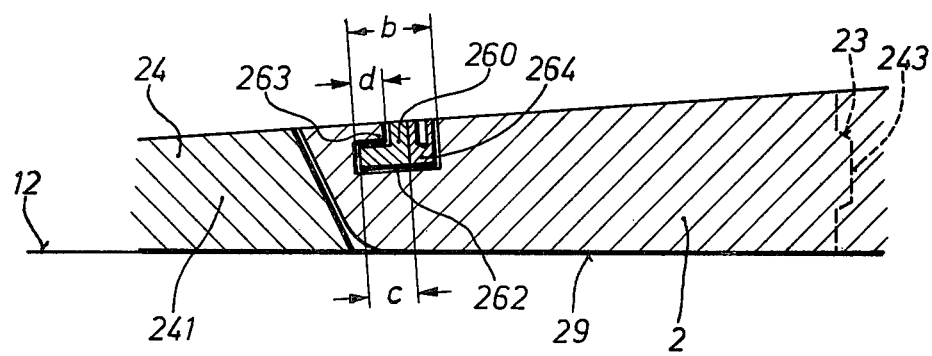
FIG. 6 is a sectional side view of the floor sill structure part shown in FIG. 5, the view being taken along

Referring initially to FIG. 1, a support assembly made in accordance with the invention employs a floor sill structure, described hereinafter, a goaf shield pivotably connected to the floor sill structure, one or more hydraulic props 17 connected between the floor sill structure and the goaf shield, a roof-engaging member carried by the shield and one or more hydraulic units connected between the floor sill structure and a linkage part of the shield. The parts of the assembly as thus described are known per se, as is the operation of these parts. The assembly is depicted as braced between the roof 11 and the floor 12 of a mine working. At the mineral face side of the assembly, i.e., remote from the goaf side of the shield, the assembly can be coupled to a conveyor (not shown) via a shifting ram (not shown) which permits the above assembly to be advanced towards the mineral face (arrow 13) to follow the working progress. In the embodiments depicted in FIGS. 1 to 4, the floor sill structure of the assembly is composed of two floor-engaging skids 2, which are laterally spaced apart by dimension $a$ (FIG. 2). As shown in FIG. 2, two rods 15 extend between the skids 2 and are attached to a connection part 16, which is itself attachable to some other structure of the mine installation—usually the conveyor. Each of the skids 2 has a rectangular cross-section and tapers in thickness, dimension $d$, towards the mineral face. The forward free zone 14 of the assembly is generally unobstructed and is of adequate size to permit ventilation and access—especially desirable with thin mineral seams.

As shown in FIG. 2, the skids 2 are provided with recesses 22 at their forward ends facing the mineral face. The rear walls of these recesses each have a horizontal groove 23 therein. The skids 2 have bores receiving detachable spindles 21 extending across the front end portions of the skids 2 to project across the recesses 22. The skids 2 are fitted, as a matter of choice, with components 24 (FIG. 3) or components 25 (FIG. 4) which locate in the recesses 22. Normally, the skids 2 would be fitted either with the components 24 or with the components 25 but purely for the purposes of this description, FIG. 2 depicts one skid 2 fitted with one component 24 and the other skid 2 fitted with the other components 25.

The component 24 is an extension component which takes the form of a plate 241 shaped to form a smooth continuous extension of the outer surfaces of the skid 2 to which it is fitted. The component 24 has rear projections 242 designed to locate within the recesses 22 of the skid 2 to which the component 24 is fitted. The rear end faces of the projections 242 have ribs 243 for locating in the grooves 23 of the recess end walls. Bores 244 are provided in the projections 242 and serve to receive the spindles 21 associated with the skid 2.

The component 25 is an insert in the form of a block provided at the rear end with a rib 252, similar to the ribs 243. Two components 25 fit snugly into the recesses 22 of the skid 2 with their ribs 252 locating in the grooves 23 of the recess end walls and the outer surfaces of the skid 2 are thus filled in. The components 25 also have through bores 251 for receiving the spindles 21.

When the skids 2 are fitted with the components 24 or 25, the components 24,25 do not project beyond the boundary surfaces 26 of the skids 2. The respective end faces 27,245,253 of the skids 2 and the components 24,25 nearest the working face extend at an angle W (FIG. 1) with respect to the floor 12 and the respective lower edges 28,246,254 of these faces 27,245,253 are rounded off. These shaping features enhance the sliding function of the skids, especially with irregular floors.

Figure 5:
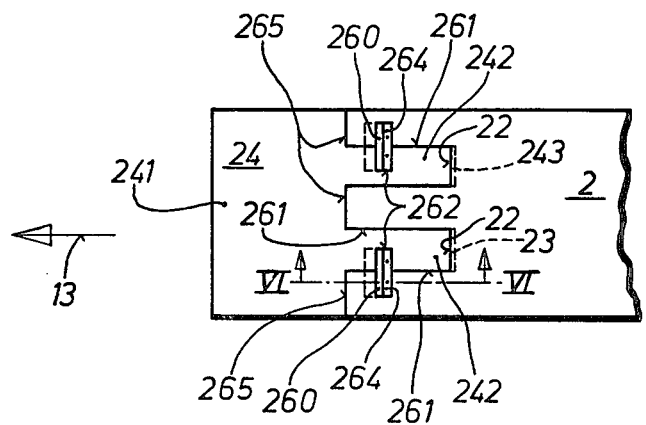
FIG. 5 is a plan view of part of a modified floor sill structure of a further form of assembly made in accordance with the invention.

FIGS. 5 and 6 show a modified floor skid structure for the support assembly in which an alternative form of connection is adopted between the components 24,25 and the associated skid 2. FIGS. 5 and 6 depict the component 24 engaged with the associated skid 2. The component 24 generally takes the form illustrated in FIG. 3 and described above and the reference numerals denote like parts. In contrast to the arrangement shown in FIG. 2, a pair of locking elements or bolts 260 are used in place of the spindles 21. These elements 260 project across the outermost mating surfaces 261 of the recesses 22 and the projections 242 and engage in L-shaped recesses 262 in the skid 2 and the projections 242. The recesses 262 are accessible from the top. Each element 260 has an L-shaped cross-section (FIG. 6) matching that of the recesses 262. Each of the elements 260 locates beneath a projection 263 of width $d$. The overall width $b$ of each recess 262 is, however greater than the width $c$ of the locking element 260. This enables the elements 260 to be easily fitted and removed. To secure the elements 260 in position, removable inserts 264 are located to the rear of the elements 260 to retain the elements 260 engaged beneath the projections 263.

In another modification, the locking elements 260 extend across the lateral mating surfaces 265 (FIG. 5) between the skid 2 and the component 24 and locate in corresponding shaped recesses. In this case, the elements 260 are thickened at their ends (say to resemble a dog bone) and the recesses are similarly shaped to secure the component 24 and the skid 2 in the direction of arrow 13.

Connections similar to those described above can also be adopted between the components 25 and the skid 2.

As mentioned previously, a support assembly, as described, can be used with its skid 2 connected to the components 24 or 25. Normally, the skids 2 are used fitted with the components 25, which serve primarily to ensure a smooth profile for the skids 2 while preventing material entering the recessed 22. This may be quite suitable for many cases especially with thin seams but, in certain circumstances, e.g., thicker seams, the skids 2 may tend to sink or penetrate too deeply into the floor 12 when the support assembly is braced. In these adverse circumstances, the components 24 can be fitted to the skids 2 in place of the components 25 to increase the effective support area 29 (FIG. 1) of the skids 2. The components 24,25 are easily fitted in the manners described above and can be interchanged as desired to cope with changing conditions. The adoption of the components 25, where possible, is advantageous since the access space 14 is effectively increased when the components 25 replace the components 24. Moreover, the connection between the part 16 and the conveyor is readily established and is unobstructed whether the components 24 or 25 are fitted.

Although the embodiments described above are concerned with assemblies with two floor skids, this is not intended to be limitative since the invention can be applied to a variety of other forms of support assembly and especially to those with single or multiple floor engaging members.

We claim

1. In or for a support assembly as used in a mineral mining installation; an improved floor skid structure which comprises: at least one skid provided with upper and lower surfaces, side surfaces and front and rear ends relative to the mineral face of the mine working in which the assembly is used, the lower surface of the skid being engageable with the floor of said working, a plurality of recesses in the front end of the skid, said recesses being spaced-apart laterally of the skid, a separate extension component provided with upper and lower surfaces, side surfaces and projections at one end, separate additional components each provided with upper and lower surfaces, wherein the extension component is locatable at the front end of the skid with its projections received in said recesses and its upper, lower and side surfaces forming continuations of the respective upper, lower and side surfaces of the skid and the additional components are receivable in the recesses when the extension component is not in use with their upper and lower surfaces substantially flush with the respective upper and lower surfaces of the skid to fill the recesses, and wherein means is provided to secure the extension component and the additional components to the skid detachably and optionally.

2. A structure according to claim 1, wherein the projections of the extension component have ribs which engage in grooves at innermost walls of the recesses.

3. A structure according to claim 1, wherein the securing means takes the form of one or more spindles insertable into alignable bores in the projections of the extension component or in the additional components and in the skid.

4. A structure according to claim 1, wherein the securing means takes the form of at least one locking element insertable into a shaped recess formed partly in the projections of the extension components or in the additional components and in the skid.

5. A structure according to claim 4, wherein the shaped recess and the locking element are of L-shaped profile and the shaped recess is open at the upper surface of the skid to permit the locking element to be inserted and withdrawn from above the skid and wherein at least one additional insert is used to retain the locking element in position.

6. A structure according to claim 4, wherein the shaped recess extends transversely of the skid.

7. A structure according to claim 1, wherein grooves are provided at the innermost walls of the recesses and the additional components are formed with ribs which engage in these grooves.

8. A structure according to claim 1, wherein the surface of the front end of the skid and the surface of the corresponding front end of the extension component is each inclined in relation to the floor of the mine working in which the assembly is used.

9. A structure according to claim 1, wherein the surface of the front end of the skid and of the corresponding front ends of the additional components are substantially flush when the components are located in the recesses and said front end surfaces are inclined in relation to the floor of the mine working in which the assembly is used.

10. A structure according to claim 1, wherein the skid tapers in width to narrow in side view in a direction towards the forward end thereof.

11. A structure according to claim 8, wherein the junctions between the front end surfaces of the skid and the extension component and their lower floor engaging surfaces are rounded off.

12. A structure according to claim 9, wherein the junctions between the front end surfaces of the skid and the additional component and their lower floor engaging surfaces are rounded off.

13. A structure according to claim 1, wherein each projection of the extension component has side surfaces which engage with corresponding side surfaces of the recess associated therewith, the engaging side surfaces extending parallel to the side surfaces of the skid and wherein the securing means extends across the engaging side surfaces.

14. A structure according to claim 1, wherein the additional components each have side surfaces which engage with side surfaces of the recess associated therewith, the engaging side surfaces extending parallel to the side surfaces of the skid and wherein the securing means extends across the engaging side surfaces.

* * * * *